(No Model.)
LE ROY McWHINNEY.
SUBSOIL ATTACHMENT FOR PLOWS.
No. 539,289. Patented May 14, 1895.
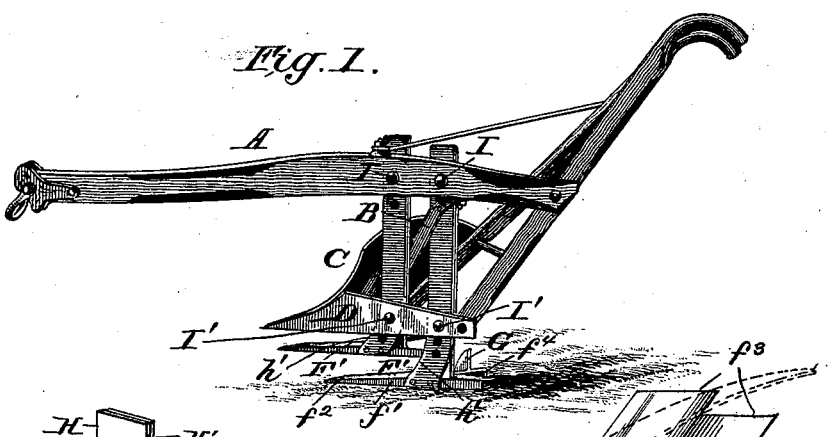
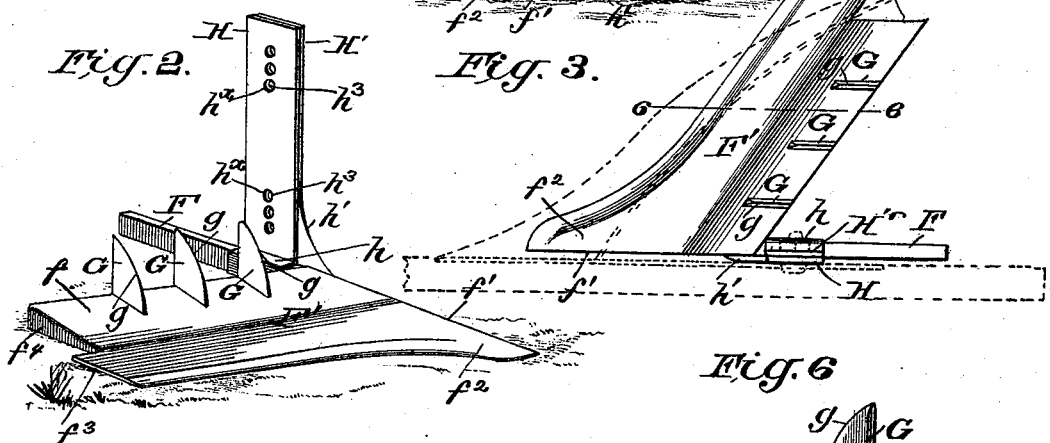
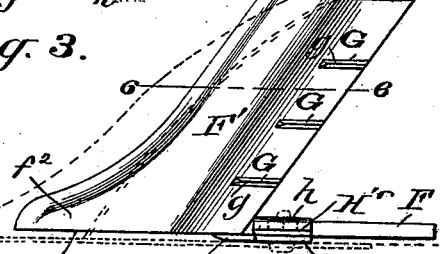
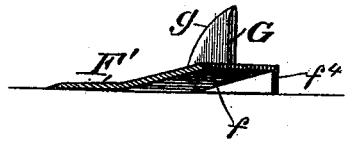
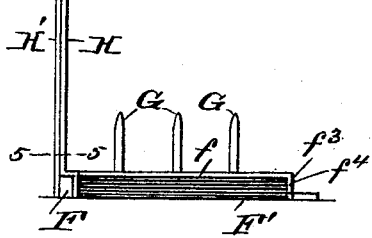
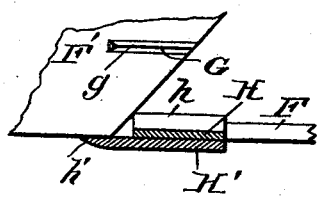
WITNESSES:
Fred G. Dieterich
Jos. A. Ryan
INVENTOR
Le R. McWhinney
BY Munn & Co.
ATTORNEYS.
THE NORRIS PETERS CO., PHOTO-LITHO., WASHINGTON, D. C.

UNITED STATES PATENT OFFICE.

LE ROY McWHINNEY, OF CRESTON, IOWA.

SUBSOIL ATTACHMENT FOR PLOWS.

SPECIFICATION forming part of Letters Patent No. 539,289, dated May 14, 1895.

Application filed February 14, 1895. Serial No. 538,391. (No model.)

*To all whom it may concern:*

Be it known that I, LE ROY McWHINNEY, residing at Creston, in the county of Union and State of Iowa, have invented a new and Improved Subsoil Attachment for Plows, of which the following is a specification.

My invention is in the nature of a sub soil attachment, adapted for use in connection with the common plow, and it primarily has for its object to provide an attachment of this character which can be quickly and securely attached to a plow, without disconnecting or rearranging any of the parts thereof.

It also has for its object to provide a sub soil attachment having a supporting portion at the right side of the shear edge, to cause it to run level and also take off the strain of weight of dirt raised, from the otherwise unsupported shear.

Furthermore my invention provides a sub soil attachment having the right side of its shear or cutting plow arranged parallel with the land side whereby, when the cutting edge wears away and is sharpened it will not become narrower.

With other objects in view which hereinafter will be referred to, the invention consists in such detail arrangement and peculiar combination of parts, such as will be first described in detail and then be pointed out in the appended claims, reference being had to the accompanying drawings, in which—

Figure 1 is a perspective view of a common plow, showing the same equipped with a pair of my improved subsoil attachments, the same being adjusted for very deep plowing. Fig. 2 is a perspective view of the attachment. Fig. 3 is a plan view of the same, the mold-board and landside of a common plow being shown in dotted lines in connection therewith. Fig. 4 is a view of the rear end of the attachment. Fig. 5 is a detail horizontal section taken on the line 5 5, Fig. 4. Fig. 6 is a transverse section taken on the line 6 6, Fig. 3.

Referring to the accompanying drawings, A indicates the beam; B, the standard; C, the mold-board, and D the landside of the plow, all of which are of the common construction.

My improved sub soil attachment the general construction of which is most clearly shown in Fig. 2, comprises a foot member F, which forms the landside portion, with which is formed, preferably integrally, the plow member F' which as shown in Fig. 6 has its shear or cutting portion arranged practically horizontal, while its rear or discharge end $f$ is slightly inclined as shown. The plow member F' inclines outward and rearward substantially on the same incline as the mold board of the plow, its landside end being formed into a tongue member $f^2$ which extends to the outer end $f'$ of the landside.

By referring to Fig. 3 it will be seen the right side or outer end $f^3$ of the plow is formed parallel with the landside, and such end has a turned down member $f^4$, which forms a foot portion or runner, which serves as a support for the outer end of the plow blade to cause it to run level, it also serving to take off the strain of the weight of dirt which would tend to bend the said plow down, and strain the attaching standard, were such end formed without a shoe portion.

By making the outer end of the plow F' parallel with the landside, the shear edge will always have the same width as it wears and is sharpened, and as the said plow in practice is made of the same width as the plow member of the common plow to which it is attached, it is manifest that it will always cut the same width as the common plow.

G G G indicate vertically arranged splitting or cutter members, integrally formed or detachably connected with the rear end of the plow member F, such cutters being also arranged parallel with the landside, and formed with curved cutting edges $g$ as shown.

H H' indicate a pair of standards one of which H has a stepped portion $h$ whereby it is capable of being readily secured to the landside and projects up flush with the outer face thereof, and such standard H has a series of apertures $h^x$ for a purpose presently explained. The standard H' consists of a flat bar the lower end of which is curved as at $h'$ to extend in the front of the bar H, such portion being sharp whereby it will act as a cutting or colter member. The bar H' is provided with a series of apertures $h^3$ which register with the apertures $h^x$ in the member H as shown.

In the practical application of my attachment the bars H and H' are secured to the beam and the landside of the plow by the bolts I I' which pass respectively through the upper and lower apertures $h^\times$ and $h^3$ as shown, after the attachment has been adjusted to the desired position.

When a pair of sub soil plows are attached to the plow, one of the said attachments may be secured to the plow standard C and the landside as shown.

Having thus described my invention, what I claim, and desire to secure by Letters Patent, is—

1. A sub soil attachment for plows, comprising a landside member having standard members connected therewith, and a diagonally disposed plow or cutting member, having a down turned portion at the outer end forming a shoe or rest portion, all arranged substantially as shown and for the purposes described.

2. A sub soil attachment for plows, comprising a landside member having standards and a cutting or plow member arranged diagonally to the landside, the outer edge being formed parallel with the landside, said plow member having upwardly extending portions, having front cutting faces said portions being arranged parallel with the landside substantially as shown and for the purposes described.

3. In a sub soil attachment for plows, the combination with the plow member F' and the landside F arranged substantially as shown, of the apertured standard members H H' secured at their lower ends to the landside one of such ends H' having its lower ends curved to project in front of the other H, and such end sharpened substantially as and for the purposes described.

4. The hereinbefore described improved sub soil attachment for plows consisting of a landside member F, a plow connected therewith and extended diagonally rearward, its front or shear face terminating in a tongue portion, said plow having its outer end formed parallel with the landside said end having a downwardly projecting shoe or runner, cutters extended up from the rear end of the plow arranged parallel with the landside and the apertured standard members H and H', one of such members having its lower end projected and sharpened to form a cutting colter all arranged substantially as shown and for the purposes described.

LE ROY McWHINNEY.

Witnesses:
WILLIAM O. HOYT,
EDWARD G. SMELTZER.